W. B. SCHAEFFER.
AUTOMOBILE WHEEL RIM.
APPLICATION FILED OCT. 7, 1913.
1,187,106.
Patented June 13, 1916.
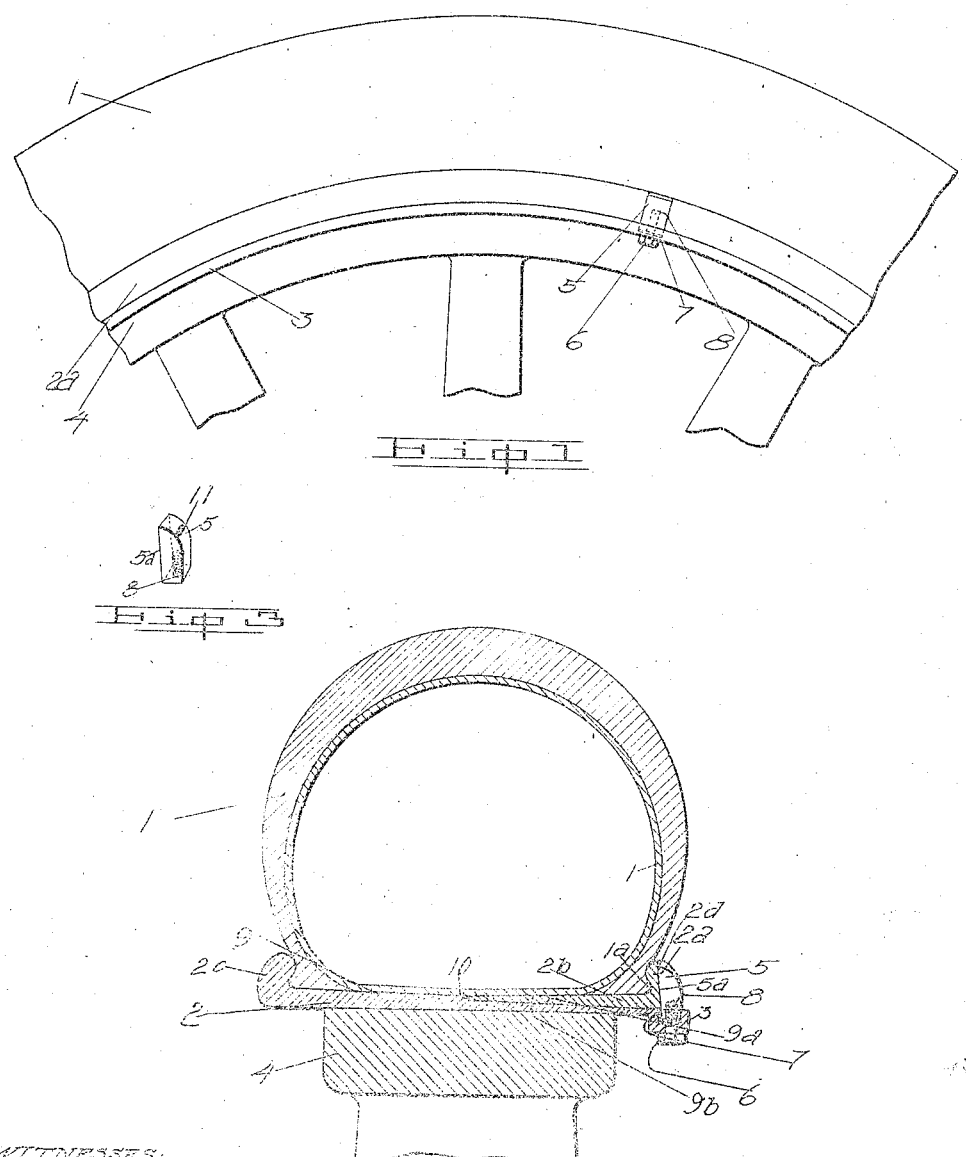

UNITED STATES PATENT OFFICE.

WILLIAM B. SCHAEFFER, OF PORTLAND, OREGON.

AUTOMOBILE-WHEEL RIM.

1,187,106.        Specification of Letters Patent.        Patented June 13, 1916.

Application filed October 7, 1913. Serial No. 793,838.

*To all whom it may concern:*

Be it known that I, WILLIAM B. SCHAEFFER, a citizen of the United States, residing at Portland, in the county of Multnomah and State of Oregon, have invented certain new and useful Improvements in Automobile-Wheel Rims, of which the following is a specification.

This invention pertains to automobile wheel rims, and has for its object to provide a rim having a removable flange so as to permit the removing of the tire therefrom, and also to permit the quick and easy restoration of the tire.

A further object is to provide means for causing the flange to be seated in the rim, which will at the same time force the tire to position in the rim.

These and other objects are illustrated in the accompanying drawing, in which—

Figure 1 is an elevation of a portion of a wheel rim and tire showing an embodiment of my improvement. Fig. 2 is a transverse vertical sectional view showing the structure of the rim and adjusting means. Fig. 3 is a detail view of a wedge lug for adjusting and binding the retaining flange.

Referring to the drawing specifically, 1 designates an ordinary tire, with the usual inner tube, and the retaining rib 1ª.

4 designates the usual wooden felly upon which is fixed the metal rim 2, having the retaining flange 2ᶜ, and upon which is secured a detachable member 2ᵇ having a tire retaining flange 2ª corresponding to the flange 2ᶜ. The main rim portion 2 inclines from the inner side of its upper surface at 9 to the longitudinal center thereof, where it is reduced at 10 forming a vertical shoulder from which point the upper surface continues at the same inclination at 9ª to the outer edge. Upon the inner face of the outer edge of this rim portion is formed a rib 3 in which are formed at suitable intervals from the upper side recesses 7 from each of which an aperture leads to the lower surface to receive the screw 6.

Upon the reduced portion of the rim portion 2 is fitted the detachable portion 2ᵇ whose lower surface 9ª is made to conform to the inclination of the main portion and is adapted to come to a fit thereon, at the instant that its inner edge contacts with the shoulder 10. The upper face of the member 2ᵇ is inwardly inclined at 9ᵇ in conformity with the surface 9.

In the outer face of the flange 2ª is formed a recess 2ᵈ corresponding in position to each of the recesses 7 in rim portion 2, and whose inner face is outwardly inclined so that its lower edge will project outwardly beyond the inner face of the recess 7. Within each of the recesses 2ᵈ is fitted a wedge 5 whose inner face 5ª is inclined to correspond with that of the recess 2ᵈ. In the lower end of the wedge 5 is formed the screw threaded aperture 8 to receive the screw threaded bolt 6 by means of which the wedge is drawn into the recess 7, which powerfully forces the detachable portion 2ᵇ upon its seat. In its outer face is a recess 11 in which to engage a tool to loosen it when it is desired to remove the tire. This arrangement permits an easy installation and removing of the tire. When the portion 2ᵇ is removed the main rim portion will be much less in diameter than the tire which will allow it to easily move well toward position, at which point it is adapted to fit. The detachable portion 2ᵇ, having a reduced inner edge, is readily inserted between the outer edge of the tire and the main rim portion, and by reason of its gradual inclination is easily forced well toward the shoulder 10. The wedges may now be inserted into their respective recesses and by means of the screw bolts, they will be caused to complete the inward movement of said member 2ᵇ. These wedges will effectually prevent a creeping or other movement of the detachable member. They need not be placed at very close intervals since the entire strain is upon the wedge and not upon the comparatively weak bolt. In removing the tire, the bolts 6 will be withdrawn, which will allow the wedges to be shaken from their seats, and a few light blows with a hammer will loosen the member 2ᵇ, when the tire will be free to be removed. It will be thus seen that "freezing" or sticking of the tire cannot so readily occur on rims made in the manner above described. For this reason the diameter of the outer portions of the surface of the rim may be slightly increased, beyond the actual size of the tire, so as to increase the tension and prevent creeping of the tire.

Having described my invention, what I claim, is—

1. A wheel rim comprising a main rim portion having a flange around one side and reduced in thickness for a portion of its width to form an annular shoulder therearound and provided with a plurality of recesses in its edge, and a supplemental rim portion having a flange around one side thereof and adapted to fit upon said main rim portion with its upper surface substantially flush with the upper surface of said main rim portion, said supplemental rim portion being provided in its flange with a plurality of recesses adapted to register with the recesses in the edge of said main rim portion, a wedging device adapted to fit into each of the registering recesses of said main and supplemental rim portions, and means for drawing the same into place, whereby to force said supplemental rim portion inwardly against the annular shoulder of said main rim portion, substantially as described.

2. In a wheel rim of the character described, a main rim portion having a flange around one edge thereof and having a tapering outer face with recesses formed in the opposite edge thereof, and a supplemental rim portion of tapering construction in cross section and having a flange formed around its thicker edge, said flange being provided in its outer side with recesses adapted to register with the recesses in the edge of said main rim, and wedging devices adapted for said registering recesses, and means for drawing the same into place, whereby to force said supplemental rim portion telescopically on to said main rim portion, substantially as described.

In testimony whereof I affix my signature in presence of two witnesses.

WILLIAM B. SCHAEFFER.

Witnesses:
E. EARL FEIKE,
HAZEL A. ARMSTRONG.